Patented Mar. 11, 1941

2,234,566

UNITED STATES PATENT OFFICE 2,234,566

CATALYTIC PROCESS FOR THE PRODUCTION OF CAPROLACTAM, AMINO-CAPRONITRILE AND HEXAMETHYLENE DIAMINE

Wilbur A. Lazier and George W. Rigby, Wilmington, Del., assignors to E. I. du Pont de Nemours & Company, Wilmington, Del., a corporation of Delaware No Drawing. Application July 23, 1938,
Serial No. 221,016

7 Claims. (Cl. 260—464)

This invention relates to the rearrangement of oximes, and more particularly to a novel process for the rearrangement of cyclohexanone oximes catalytically.

It is known to the art that oximes when heated in the presence of acids, particularly strong mineral acids, undergo rearrangement. Usually this rearrangement yields an amide. Thus, Organic Syntheses, volume XVII, page 60, gives directions for the rearrangement of cyclohexanone oxime. The reaction is carried out by dissolving the oxime in strong sulfuric acid and heating until the reaction becomes exothermic. It is necessary to carry out the preparation in 10 gram portions since the reaction is difficult to control and may proceed with explosive violence. The product must be isolated from the strong sulfuric acid solution by neutralizing with alkali followed by prolonged extraction with ether. The neutralization of the large quantities of sulfuric acid employed must be carried out with considerable care to avoid loss of product, since concentrated sulfuric acid and strong alkali react violently when mixed. All of these considerations make the "Beckman rearrangement" useful only as a laboratory preparatory method. Large scale preparations by this method would be so hazardous that commercial applications of the reaction have never, to the best of our knowledge, been made.

In place of sulfuric acid other reagents such as $PCl_5$, $P_2S_5$, $P_2O_5$, HCl, NaOH, p-toluene sulfonyl chloride, etc. have been used.

The object of this invention, therefore, is to provide a practical and continuous method for carrying out the rearrangement of a cyclohexanone oxime. A further object of the invention is to provide a readily controlled process for carrying out the rearrangement of cyclohexanone oximes. A still further object of this invention is to facilitate the isolation of the rearrangement products from cyclohexanone oximes. Another object is the production of a new chemical compound. Other objects will appear hereinafter.

These objects are accomplished by the following invention which comprises one or more of the following steps taken separately or in combination:

(1) Contacting a cyclohexanone oxime with a dehydration catalyst at an elevated temperature (preferably in the presence of ammonia);

(2) Separating from the resulting mixture epsilon-amino-caprolactam and hexene-5-nitrile;

(3) Catalytically hydrogenating the epsilon-hexenonitrile to n-hexylamine;

(4) Bringing the epsilon-amino-caprolactam together with ammonia into contact with a dehydration catalyst at an elevated temperature, thereby producing epsilon-amino-capronitrile; and (5) Catalytically hydrogenating epsilon-aminocapro-nitrile to hexamethylene diamine.

A more detailed description of this process is provided in the following examples, which illustrate but in no way limit the invention.

Example 1

The vapors of cyclohexanone oxime together with six molecular portions of ammonia were contacted with silica gel at 360° C. The reaction product was collected as a two phase liquid; the oil and aqueous layers were separated and purified separately. The oil layer was found to consist of about one-half hexene-5-nitrile, B. P. 50° C./12 mm. Hydrogenation of this nitrile in the liquid phase, using Raney nickel catalyst, gave n-hexyl amine, B. P. 136° C., $$N_D^{20} 1.4312$$

$$D_4^{20} 0.807$$

neutral equivalent 127.4, chloroplatinate, M. P. 237° to 239° C. The remainder of the oil fraction consisted of a trimeric condensation product of hexenonitrile, B. P. 130° to 140° C./2 mm., $$N_D^{25} 1.5394$$

It soon solidified to a crystalline solid, M. P. 132° C., which could be conveniently recrystallized from acetone.

Analysis gave:
C, 79.16, 79.41; H, 9.05, 9.03; N, 10.18, 10.24
$C_{18}H_{24}N_2$ requires:
C, 80.6; H, 8.95; N, 10.45

Exhaustive ether extraction of the aqueous layer followed by evaporation of the ether solution yielded pure ε-caprolactam, M. P. 68° to 69° C., B. P. 112° to 113°/5 mm. The melting point was not depressed by mixing with an authentic sample of ε-caprolactam.

Example 2

A. Two hundred and fifty parts of cyclohexanone oxime together with 6 molecular proportions of ammonia were passed over silica gel at the rate of 60 parts per hour at a temperature of 250° C. The product consisted of two light colored liquid layers. The oil layer was separated and fractionally distilled to yield 35.9 parts of hexene-5-nitrile, B. P. 70° C./15 mm., and 39.7 parts of the trimolecular condensation product, B. P. 130° to 140° C., M. P. 132° C. The aqueous layer was exhaustively extracted with ether and, after removal of the ether, was vacuum distilled. The first portion, B. P. 75° C./2 mm. consisted of ε-aminocapronitrile. The main product, ε-caprolactam, then distilled at 112° to 113°/5 mm. and was recrystallized from petroleum ether. It melted sharply at 69° C. and the melting point was not depressed by mixing with an authentic sample.

B. One hundred and six (106) parts of ε-caprolactam, as prepared in Part A, together with six molecular equivalents of ammonia was passed over a catalyst (composed of metallic copper deposited on silica gel) at 360° C. The product was distilled through a seven transfer unit column. The first fraction consisted of 26 parts of ε-aminocapronitrile, B. P. 75° C. at 2 mm.;

$$N_D^{20} 1.4740$$

$$D_4^{20} 0.905$$

neutral equivalent 114.6. The second fraction was unchanged ε-caprolactam.

Hydrogenation of the ε-aminocapronitrile in the presence of ammonia, using a Raney nickel catalyst gave hexamethylene diamine, identified as the picrate (M. P. 222° C.). The melting point was not depressed by mixing with an authetic sample.

In place of cyclohexanone oxime one may use the oximes of α-methyl cyclohexanone, α-dodecyl cyclohexanone, γ-methyl cyclohexanone, α-keto-cyclohexanone, tertiary butyl and tertiary amyl cyclohexanone oximes, etc.

Dehydrating oxides and salts appear to be useful in this reaction. Thus, it is preferred to use silica gel although dehydrating oxides and salts such as alumina, magnesia, thoria, titania, tungsten oxide, heteropoly acids such as phosphotungstic acid or phosphomolybdic acid or modifications of these such as phosphated aluminum hydrate or thoria on silica gel may be used.

Temperatures of from about 200° to about 500° C. may be used in the rearrangement reaction. The exact operating temperature to be used must be determined in each case by: (1) the oxime being rearranged; (2) the catalyst employed; (3) the time of contact; and (4) the particular product desired. Thus with cyclohexanone oxime more hexene-5-nitrile is formed over silica gel at 360° C. than at 250° C. while the quantity of ε-caprolactam formed is highest at the lower temperature. Likewise, the time of contact chosen must be suitable for the catalyst, the temperature, the oxime and the product desired. In all cases these interrelated variables must be properly coordinated so that optimum results may be obtained. The time of contact moreover depends upon the quantity of catalyst, the pressure on the system and upon the partial pressure of the oxime. It has been found that good control of the reaction may be obtained by diluting the oxime vapors with ammonia.

The pressure may be atmospheric, superatmospheric or subatmospheric, depending upon the choice of other conditions discussed above. In general, however, it is preferred to operate at substantially atmospheric pressure with a short time of contact and a relatively high temperature.

In catalytically hydrogenating the nitriles to the corresponding amines any known method for carrying out this reaction may be used. The conditions of temperature, pressure, catalyst, etc., will of course vary with the process selected and the material treated. In general, the process is operative within the temperature range of 25° to 200° C. and at pressures ranging from subatmospheric to a maximum determined by the practical limitations of the vessel used in carrying out the reaction. Any hydrogenation catalyst may be used although nickel and cobalt have been found to be especially suitable. The hydrogenation reaction is preferably carried out in the presence of ammonia as better yields of primary amines are obtained thereby.

Suitable apparatus for carrying out this invention may be chosen from among the various designs of continuous flow, vapor phase catalytic apparatus aavilable, provided that suitable means for vaporizing the oxime are provided. Since many oximes are relatively high boiling, it has been found advisable in some cases to use either (a) subatmospheric pressure or (b) a carrier gas with fairly low partial pressure of the oxime. Either of these expedients simplifies removal of the large amounts of heat liberated by the rearrangement reaction.

It is apparent that many widely different embodiments of this invention may be made without departing from the spirit and scope thereof and therefore it is not intended to be limited except as indicated in the appended claims.

We claim:

1. The process which comprises bringing a cyclohexanone oxime in the vapor phase, while admixed with ammonia, into contact with a dehydration type catalyst at a temperature between about 200° C. and about 500° C. and thereby obtaining caprolactam.

2. The process in accordance with claim 1 characterized in that the dehydration type catalyst is silica gel.

3. The process which comprises bringing a cyclohexanone oxime into contact with a dehydration catalyst at a temperature between about 200° C. and about 500° C., recovering ε-caprolactam from the resulting product and passing same together with an excess of ammonia over copper-on-silica gel at a temperature of about 360° C., thereby producing ε-amino-capronitrile.

4. The process which comprises bringing a cyclohexanone oxime into contact with a dehydration catalyst at a temperature between about 200° C. and about 500° C., recovering ε-caprolactam from the resulting product and passing same together with an excess of ammonia over copper-on-silica gel at a temperature of about 360° C., thereby producing ε-amino-capronitrile, and catalytically hydrogenating the ε-amino-capronitrile to hexamethylene diamine.

5. The process which comprises bringing ε-caprolactam and an excess of ammonia into contact with a copper-on-silica gel catalyst at a temperature of about 360° C.

6. The process which comprises catalytically hydrogenating ε-aminocapronitrile in the presence of ammonia and recovering hexamethylene diamine.

7. The process which comprises bringing a mixture of cyclohexanone oxime and ammonia in the molar ratio of 6:1 in the vapor phase into contact with silica gel at a temperature of about 360° C. and thereby obtaining caprolactam.

WILBUR A. LAZIER.
GEORGE W. RIGBY.